March 9, 1926.  
P. GRESSER  
CONNECTION FOR LUBRICATING SYSTEMS  
Filed June 15, 1925     3 Sheets-Sheet 1
1,575,755
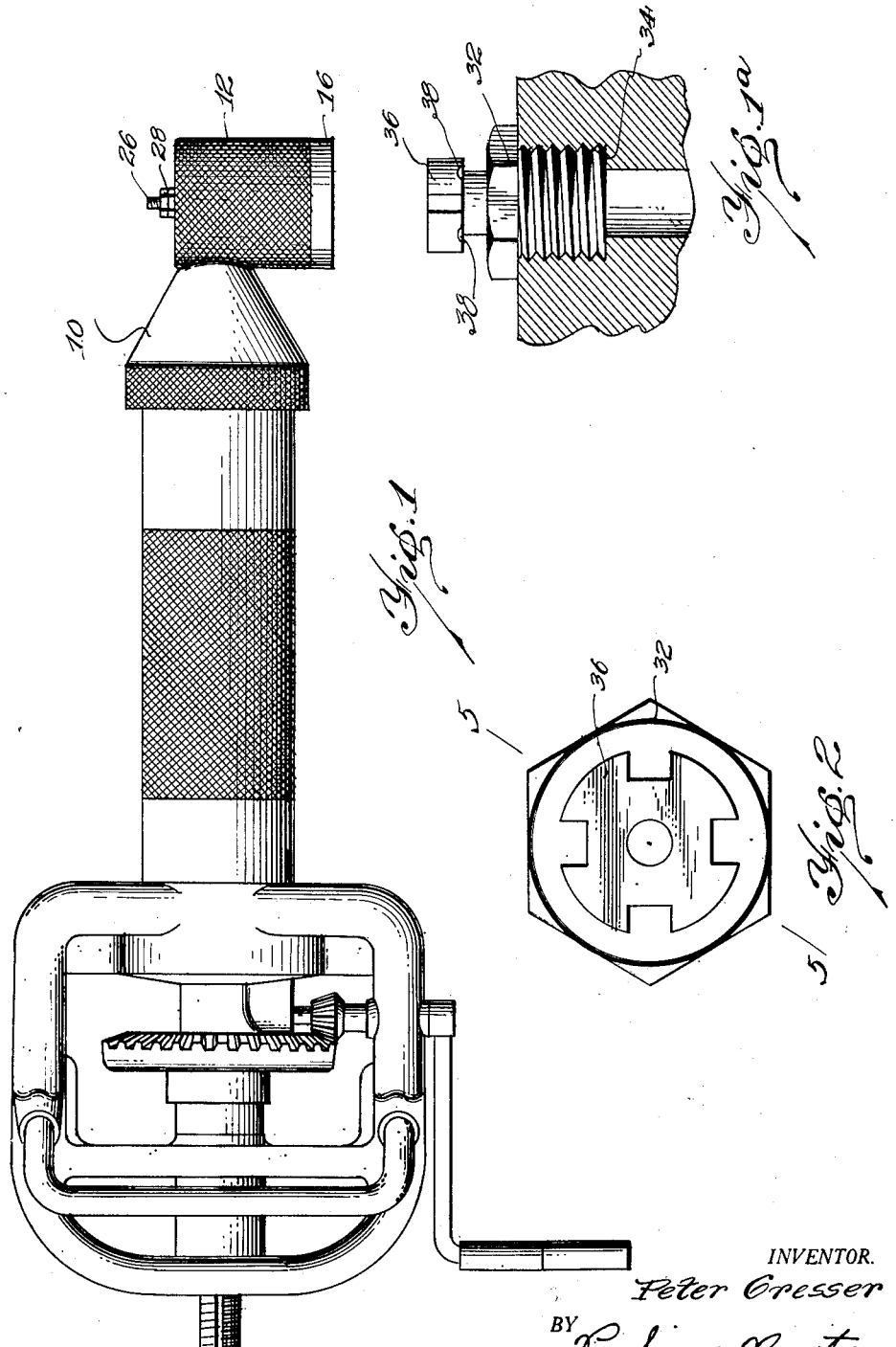
INVENTOR.  
Peter Gresser  
BY Parker & Burton  
ATTORNEY.

March 9, 1926.  1,575,755
P. GRESSER
CONNECTION FOR LUBRICATING SYSTEMS
Filed June 15, 1925  3 Sheets-Sheet 2
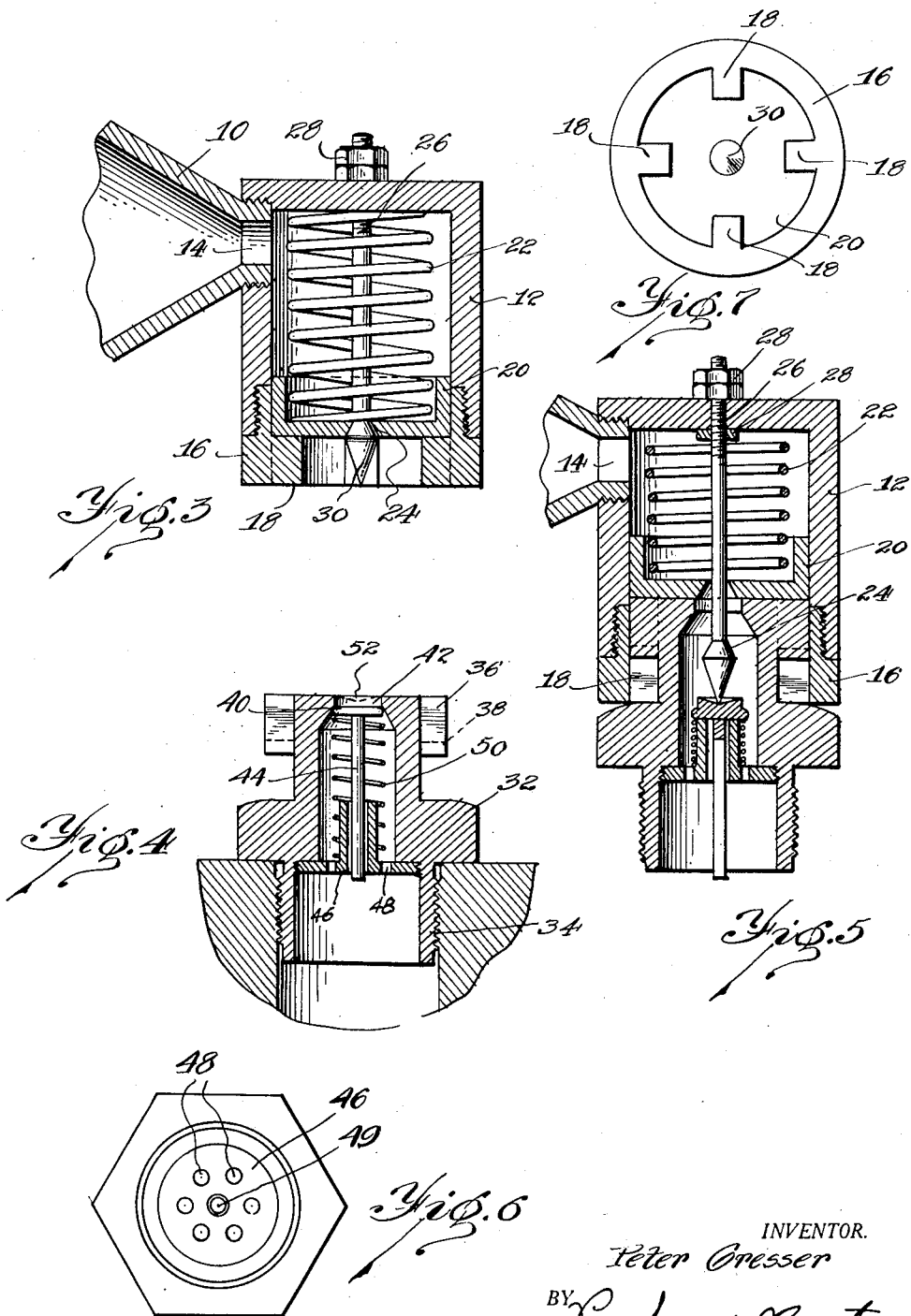
INVENTOR.
Peter Gresser
BY Parker & Burton
ATTORNEY.

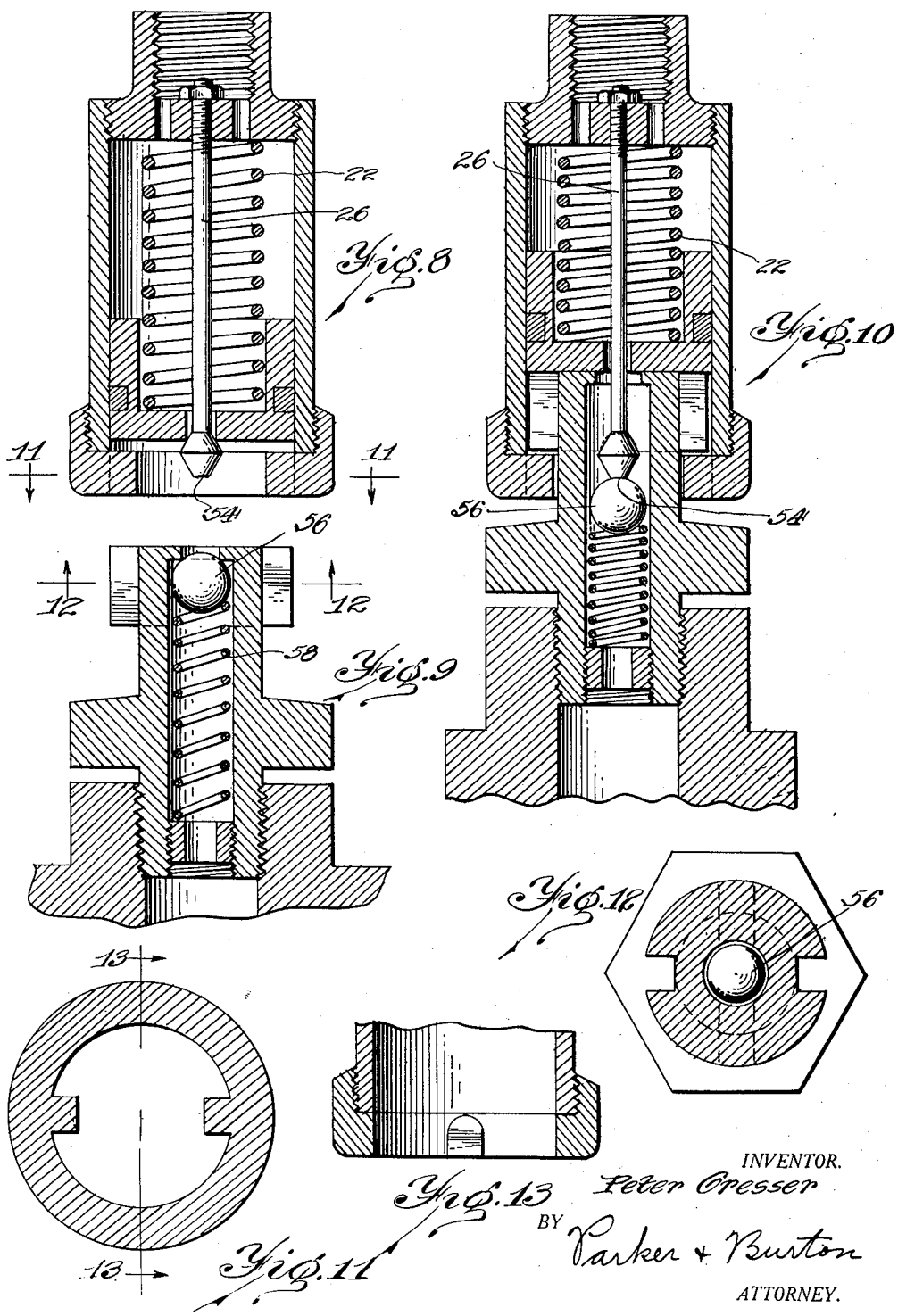

Patented Mar. 9, 1926.

1,575,755

UNITED STATES PATENT OFFICE.

PETER GRESSER, OF CHICAGO, ILLINOIS.

CONNECTION FOR LUBRICATING SYSTEMS.

Application filed June 15, 1925. Serial No. 37,213.

*To all whom it may concern:*

Be it known that I, PETER GRESSER, a citizen of the United States, residing at Chicago, county of Cook, State of Illinois, have invented a certain new and useful Improvement in Connections for Lubricating Systems, and declare the following to be a full, clear, and exact description of the same, such as will enable others skilled in the art to which it pertains to make and use the same, reference being had to the accompanying drawings, which form a part of this specification.

My invention relates to an improved connection for a high pressure lubricating system.

My improved connection is particularly intended to be used in conjunction with high pressure lubricating apparatus where it is essential that the grease gun be securely supported at its discharge end by the connection of the fitting to be lubricated; for example, in the lubrication of railway locomotives, heavy stick grease is employed and it is necessary to provide considerable pressure. The gun, though portable, is a substantial piece of apparatus and must be rigidly and securely held at the discharge nozzle by the fitting to which grease is to be supplied. The construction of my improved connection is such that the nozzle end of the gun is securely and firmly held by the fitting during the operation of the gun.

I furthermore provide a connection, the parts of which are long wearing and which make a tight joint between the fitting and the dispensing device. The connection formed between the nozzle and the fitting to be lubricated is such that the inlet valve to the fitting is opened at the beginning of the movement of engagement of the parts and subsequently during the completion of the movement of the engagement of the parts the discharge valve of the nozzle is opened. The construction which I have provided to accomplish this result is positive, efficient, and simple.

The above objects and others and further advantages of my invention will more fully appear from the following description and appended claims and the accompanying drawings, in which:

Figure 1 is an elevation of a grease gun provided with my improved nozzle, and

Fig. 1ª is an elevation partly in section of my improved co-operating fitting.

Fig. 2 is a plan of the fitting shown in Fig. 1ª.

Fig. 3 is a vertical sectional view through the nozzle.

Fig. 4 is a similar vertical sectional view through the fitting.

Fig. 5 is a vertical sectional view through the fitting and nozzle when connected together taken on line 5—5 of Fig. 2.

Fig. 6 is a rear elevation of the fitting.

Fig. 7 is a plan view of the nozzle.

Fig. 8 is a vertical sectional view through a modified form of my delivery nozzle.

Fig. 9 is a cross-sectional view through a modified form of fitting.

Fig. 10 is a cross-sectional view taken on the same lines as Figs. 8 and 9 showing the parts in engagement.

Fig. 11 is a cross-sectional view taken on line 11—11 of Fig. 8.

Fig. 12 is a cross-sectional view taken on the line 12—12 of Fig. 9.

Fig. 13 is a cross-sectional view taken on the line 13—13 of Fig. 11.

I have illustrated my improved connection in conjunction with a suitable grease gun such as that shown in my co-pending patent application, Serial No. 708,629, filed April 24, 1924. This grease gun is adapted to receive stick lubricant and through the gear driving mechanism provided this lubricant is ejected through the nozzle to the fitting to be lubricated. I have shown the nozzle proper as carried by a detachable nose 10 of the body of the grease gun. The nozzle comprises a casing 12 communicating with the nose 10 through an inlet 14 and being threaded thereon. A ring 16 is threaded into the outer end of the casing 12. This ring is provided with a plurality of equidistant internally projecting lugs 18. A valve plate 20 is mounted within the casing and held outwardly by a spring 22 against the lugs 18 of the ring and against a seat 24 on a pin 26 which pin is disposed axially within the casing 12. The pin is securely held within the casing by nuts 28 and the point of the pin 30 is substantially flush with the outer end of the nozzle.

The valve plate 20 is preferably a metal plate ground to form a close fit within the casing and upon the seat of the pin. It is slidably mounted upon the pin and yields resistingly inwardly against the tension of the spring 22 when the connection is made between the nozzle and the fitting. The opening through the plate around the pin is larger than the diameter of the pin to provide an annular lubricant passageway around the pin.

The fitting comprises a casing 32, threaded at 34, to be received within the part to be lubricated. This casing is provided at its outer extremity with an external notched collar, or what might be termed a plurality of equidistant externally projecting lugs 36. These lugs are adapted to be received between the lugs 18 of the ring 16 when the connection is made between the nozzle and the fitting. The lugs 36 are provided on their rear faces with recesses 38. Each of these recesses is adapted to engage a lug 18 of the ring.

The fitting is provided with an inlet 40 controlled by a valve 42, and a valve stem 44 which travels within a guide 46. This guide is provided with a plurality of perforations 48 about its axial tubular portion to permit the flow of lubricant therethrough. A spring 50 holds the valve outwardly against its seat. The outer face of the valve is provided with a depresion 52 to center the same on the tip 30 of the pin 26 when the connection is made.

To connect the nozzle with the fitting the nozzle is inserted over the fitting, the lugs 36 of the fitting passing between the lugs 18 of the nozzle. At the initial movement of engagement the tip of the pin 30 engages within the cavity 52 of the valve 42 and unseats the valve to place the fitting in readiness to receive lubricant. The extremity of the fitting engages the plate 20 of the nozzle and as the nozzle is forced downwardly over the fitting, plate 20 yields resistingly inwardly against the spring 22, opening the annular passageway about the pin 26 for the discharge of the lubricant from the nozzle to the fitting.

When the lugs 36 of the fitting clear the lugs 18 of the nozzle, the nozzle is rotated relative to the fitting to bring the inner faces of the lugs 18 and 36 into engagement, and the lugs 18 seat in the recesses 38 of the lugs 36 and the parts are releasably locked together against detachment or rotation until after an axial movement of separation which permits the parts to be relatively rotated for release. This connection is unusually secure and firm. It also makes a tight close fitting joint. The valve members are positively actuated in their proper sequence.

In Figs. 8 to 13 inclusive I have shown a modified form of structure in which the pin 26 is provided with a head having a concavity 54 at its outer end and the fitting is provided with a ball check valve 56 held outwardly by a spring 58 to close the inlet to the fitting. I have here shown a fitting and delivery nozzle as provided with a pair of opposed lugs instead of two pairs, as illustrated in Figs. 1 to 7 inclusive. Otherwise the construction is substantially the same as that shown in the first seven figures of the drawings. At the time of engagement of the parts for lubrication the concavity 54 fits about the ball 56, centering the same for inward movement to open the intake to the fitting.

What I claim is:

1. In a connection for a lubricating system, a female part provided with a valve-controlled orifice, a male part provided with a valve-controlled orifice and with a notched external collar, said male part adapted to be received within the female part to bring said orifices into communication, said female part provided with an internal collar notched to permit the collar on the male part to pass therethrough and engage on the rearward side thereof, the meeting faces of said collars having co-operating locking portions adapted to releasably engage each other to prevent relative rotation of said parts said female part provided with a pin adapted to engage and unseat the valve of the male part during the locking movement of said parts, said pin provided with a valve seat, the valve of said female part slidably associated with said pin to provide a lubricant passageway therearound and held normally outwardly by a spring against the seat on the pin, said male part having a portion adapted to engage the valve of said female part during the movement of engagement of said parts and unseat the same.

2. In a connection for a lubricating system a coupling adapted to receive lubricant and having a valve-controlled inlet orifice, a discharge nozzle having a valve-controlled outlet orifice, said coupling provided with a plurality of equidistant externally projecting lugs, said nozzle having a chamber adapted to receive the end of said coupling, which chamber is provided with a plurality of internally projecting lugs spaced apart to permit the lugs of the coupling to pass therebetween and be engaged therewith on the inner side of the chamber, the meeting faces of said lugs provided with co-operating tongues and recesses to lock said parts releasably together, said nozzle provided with a pin projecting axially into the chamber and adapted to engage and unseat the valve of the coupling during the locking movement, said pin provided at its extremity with a valve seat, a valve plate slidably associated with said pin to provide an annular lubricant passageway around the pin, said plate held normally under spring pressure against the seat on the pin to close the discharge orifice, said plate adapted to be engaged by the end of the coupling during the locking movement of said parts to be moved resistingly inwardly to open the discharge outlet.

3. In a connection for a lubricating system, a part to discharge lubricant, said part having a chamber open at the outer end, a pin projecting axially into said chamber, said pin having a valve seat, a valve plate slidably associated with the pin to provide a lubricant passageway about the pin, a spring holding said valve plate normally outwardly against the seat on the pin to close the discharge outlet, a part to receive lubricant, said part receivable within the chamber of the first part and having a normally closed intake valve adapted to be engaged and unseated by said pin upon insertion of the part within said chamber, said second part adapted to be releasably locked within the chamber of the first part to receive lubricant therefrom and having a portion adapted to engage the valve plate of the first part to move the same rearwardly to open the discharge orifice of the first part.

4. In a connection for a lubricating system, a part to receive lubricant provided with a valve-controlled inlet, a part to discharge lubricant provided with a valve-controlled discharge opening, one of said parts having a chamber to receive the other part to detachably connect said parts together for the discharge of lubricant from the one part to the other part, a pin positioned axially within said chamber, said pin having a valve seat, a valve within the chamber slidably associated with said pin to provide a passage therearound and held normally under spring pressure against the seat thereon to close the lubricant passageway, said valve resistingly yieldable inwardly to open a lubricant passageway about said pin.

5. In a connection for a lubricating system, a part to receive lubricant provided with a valve-controlled inlet, a part to discharge lubricant provided with a valve-controlled outlet, one of said parts being a female part and having a chamber adapted to receive the other part to detachably connect said parts together for the discharge of lubricant from the one part to the other part, a pin having a concavity at its outer end positioned axially within the chamber of the female part, said pin having a valve seat, a valve slidably associated with said pin held normally under spring pressure against the seat of the pin adapted to yield resistingly inwardly to open a lubricant passageway about the pin, said male part having a ball check valve controlling its lubricant passageway adapted to be engaged by the concavity of the pin of the female part during the movement of engagement of said parts to unseat said valve.

6. In a connection for a lubricating system, a part to receive lubricant provided with a valve-controlled inlet, a part to discharge lubricant provided with a valve-controlled outlet, one of said parts being a female part, the other part being a male part, said female part having a chamber to receive the other part, said chamber provided with spaced-apart internally projecting lugs, said male part provided with spaced-apart externally projecting lugs adapted to pass between the lugs within the chamber when the male part is inserted within the chamber, said parts adapted to be rotated to bring the lugs into engagement to lock said parts together, a pin having a concaved outer end positioned axially within said chamber, said pin having a valve seat, a valve member slidably associated with said pin held under spring pressure against the seat thereon adapted to yield resistingly inwardly to open a lubricant passageway about the pin, a ball check valve held under spring pressure to normally close the lubricant passageway of the male part, said pin adapted to engage said ball check valve to unseat the same when the two parts are engaged together, said male part having a portion adapted to engage the valve on the pin to unseat the same during the engagement of said parts.

7. In a connection for a lubricating system, a female part provided with a valve controlled orifice, a male part provided with a valve controlled orifice, the male part adapted to be received by the female part to bring said orifices into communication, means for quickly locking together and unlocking the said male and female parts, one of said parts provided with a pin adapted to engage and unseat the valve of the other or said parts during the initial locking movements of said parts, said pin being provided with a valve seat and a valve slidably associated therewith to provide a lubricant passage around said pin, a spring for normally urging said valve against the valve seat on the pin, the other of said lubricating parts having means for engaging and lifting the said slidable valve relative to the pin to unseat the same when the parts are in their operative locked position.

8. In a connection for lubricating systems, a female part provided with a valve controlled orifice, a male part provided with a valve controlled orifice, means for quickly locking together and unlocking said parts to bring said orifices into communication, said female part comprising a casing, a pin rigidly secured within said casing and adapted to engage and unseat the valve of the male part during the locking movement of said parts, said pin being provided with a valve seat, the valve of the female part slidably associated with said pin to provide a lubricant passageway therearound and held normally outwardly by a spring against the seat on said pin, said male part having a portion adapted to engage the valve of the female part during the movement of engagement of said parts and unseat the same, said valve for the female part being of substantially cup-shaped formation and closely fitting the interior walls of said casing and internal shoulders on the lower part of said casing for limiting the outward movement of the cup shaped valve and affording a tight seating engagement therewith.

In testimony whereof, I sign this specification.

PETER GRESSER.